United States Patent [19]

Braddick

[11] 4,293,163

[45] Oct. 6, 1981

[54] VALVE FOR CLOSING THE FLUID PASSAGE OF A WELL BORE TUBULAR MEMBER WITH BALANCED OPERATING ARRANGEMENT

[75] Inventor: Britt O. Braddick, Houston, Tex.

[73] Assignee: Texas Iron Works, Inc., Houston, Tex.

[21] Appl. No.: 790,959

[22] Filed: Apr. 26, 1977

[51] Int. Cl.³ .................................................. F16K 39/00
[52] U.S. Cl. .................................. 251/283; 251/214; 251/315
[58] Field of Search ............... 251/214, 281, 282, 283, 251/315, 316; 137/315

[56] References Cited

U.S. PATENT DOCUMENTS

| | | | |
|---|---|---|---|
| 1,657,841 | 1/1928 | Peris | 251/283 |
| 1,680,812 | 8/1928 | Sloan | 251/283 |
| 1,772,406 | 8/1930 | Whiton | 251/282 |
| 2,152,831 | 4/1939 | Williams | 251/282 |
| 2,634,087 | 4/1953 | Hess | 251/283 |
| 2,962,039 | 11/1960 | Shand et al. | 251/282 |
| 3,161,204 | 12/1964 | Roy, Sr. | 251/315 |
| 3,164,169 | 1/1965 | Pareto | 251/315 |
| 3,179,121 | 4/1965 | Bredtschneider et al. | 251/316 |
| 3,195,560 | 7/1965 | Pofit | 137/315 |
| 3,281,112 | 10/1966 | Walker | 251/214 |
| 3,430,919 | 3/1969 | Frazier | 251/283 |

Primary Examiner—Martin P. Schwadron
Assistant Examiner—G. L. Walton
Attorney, Agent, or Firm—Jack W. Hayden

[57] ABSTRACT

A valve arrangement includes spherical core means rotatably mounted in a tubular member with operating means connected to the spherical core means and rotatably supported in a lateral opening in the tubular member to open and close the spherical core means for controlling flow through the tubular member. Seal means are provided between the spherical core means and tubular member and between the operating means and the tubular member with the operating means and the spherical core means having fluid passage means to conduct fluid from the tubular member fluid passage to act on the seal means between the operating means and the tubular member to substantially counterbalance the fluid pressure in the tubular member.

3 Claims, 4 Drawing Figures 4,293,163

VALVE FOR CLOSING THE FLUID PASSAGE OF A WELL BORE TUBULAR MEMBER WITH BALANCED OPERATING ARRANGEMENT

SUMMARY OF THE INVENTION

Kelly valves are well known and have been in use for a number of years in rotary drill strings between the kelly and the saver sub and between the swivel and the kelly to provide a means for closing off the fluid passage of the drill sting at the derrick floor in case of a blow out in the well bore.

Such arrangements heretofore have included a common form of valve means, such as a spherical core rotatably mounted in a sub or tubular member, which spherical core is provided with a recess on its outer surface and an operating stem that is rotatably mounted in a lateral passage in the tubular member. A projection on the operating stem engages in the recess of the spherical core. The operating stem is provided with a non-circular counterbore so that a tool may be engaged therein to rotate the stem and connected spherical core to open and close the fluid passage through the sub or tubular member in which the spherical core is rotatably mounted, as may be desired.

In some instances a tubular member with a valve is employed in other situations, such as by way of example only, in work over operations, in running or pulling pipe, or when drill pipe is added to a drill string.

In situations where the fluid pressure in the tubular member with which the valve is associated is substantial, it can be appreciated that such fluid pressure tends to act against the operating stem and may tend to jam the operating stem thus making it more difficult to open and close the spherical core.

The present invention provides a valve arrangement which enables fluid pressure from the fluid passage of the tubular member to be conducted to the operating stem and more particularly between spaced seals on the operating stem in a manner to substantially counterbalance the fluid pressure in the fluid passage of the tubular member and thus relieve the load acting against the operating stem so that it may be more quickly and easily operated.

An object therefore of the present invention is to provide a valve arrangement for the fluid passage of a tubular member including spherical core means and an operating stem therefor with seal means between the operating stem and the tubular member and the spherical core means and the tubular member to inhibit fluid leakage therebetween, the spherical core means and the operating stem having passage means to communicate fluid from the tubular member fluid passage to the seal means so as to counterbalance the fluid pressure in the fluid passage and thus reduce the pressure acting on the operating stem.

Other objects and advantages of the present invention will become more readily apparent from a consideration of the following description and drawings.

DESCRIPTION OF THE PREFERRED EMBODIMENT

Figure 1:
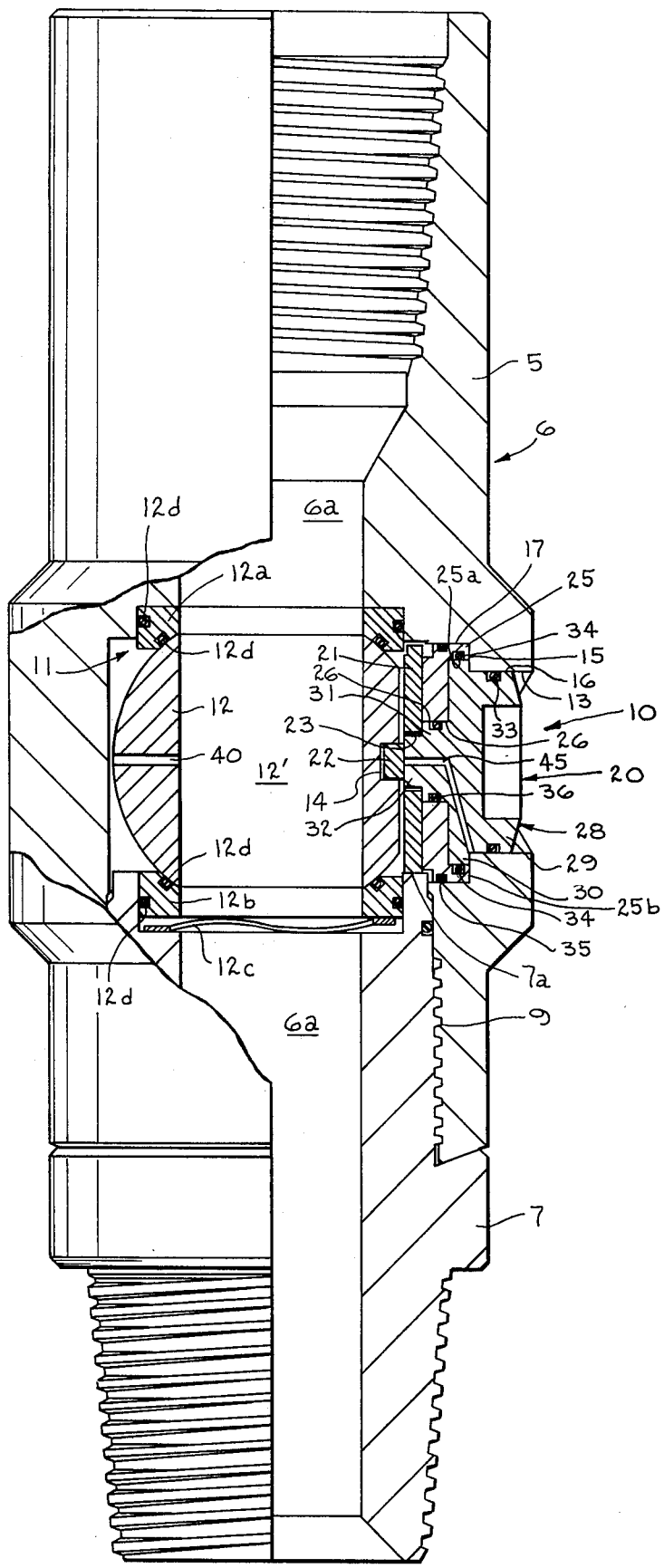
FIG. 1 is a partial sectional view cut away to illustrate the details of the present invention.

Attention is first directed to FIG. 1 of the present invention wherein a tubular member or sub is illustrated generally by the numeral 6 with the valve arrangement therefor being referred to generally by the numeral 10.

The sub or valve body 6 is illustrated as comprising tubular portions 5 and 7 which are threadedly connected together as shown at 9 and when connected assist in retaining the valve arrangement illustrated at 10 in position therein.

The sub 6 is provided with a suitable chamber referred to generally at 11 for receiving the spherical core means 12 and other components of the present invention. A passage 13 extends laterally from the chamber 11 and out one side of the valve body or sub 6 as shown for access to operate the spherical core means 12 to move it to open and closed position for controlling fluid flow through the fluid passage 6a of the valve body 6.

The lateral passage 13 through the sub 6 is provided with an annular shoulder 15 intermediate its ends defining a first portion 16 in the passage 13 of a smaller diameter than a second portion 17.

The spherical core means 12 is supported in the chamber 11 by suitable seating rings 12a and 12b as well as the resilient means 12c.

Suitable seal means 12d are provided between the seating rings 12a, 12b, and the sub 6 and between the spherical core means 12 and the seating rings 12a, 12b so that the chamber 11 surrounding spherical core means 12 does not communicate with the longitudinal fluid passage 6a of the tubular member 6 except as described.

The spherical core means 12 is thus rotatably positioned within the chamber 11 and is provided with a bore or passage 12' for alignment with the longitudinal fluid passage 6a formed by the sub portions 5 and 7 to accommodate flow therethrough. When the spherical core 12 is rotated to the position shown in FIG. 2, flow through the fluid passage 6a of the sub or tubular member 6 is shut off.

Operating means referred to generally by the numeral 20 are provided for rotating the spherical core means 12 to open and closed position in the tubular member 6.

Such operating means 20 includes annular disc means 21 fitting within the lateral passage 13 adjacent spherical core means 12 as shown in FIG. 1 of the drawings. The disc means includes a laterally extending projection 22 as well as a non-circular central opening 23 as shown. The spherical core means 12 is provided with a recess 14 for receiving the projection 22 of the disc means 21 which serves to connect the spherical core means 12 with the operating means 20 as will be described. An annular retainer 25 abuts the disc means 21 as shown and includes a central circular opening 26 therein. The retainer 25 also abuts the shoulder 15 formed in lateral passage 13 as shown in the drawings.

A cylindrical member referred to generally at 28 includes a first annular portion 29 fitting in the first portion 16 of the lateral opening 13 on one side of the shoulder 25 in the circular opening 13. A second annular portion 30 of the cylindrical member is of larger diameter than the first annular portion 29 and abuts the shoulder 15 as shown in FIG. 1 of the drawings. The second annular portion 30 fits in the annular recess 25a of retainer 25 which recess forms an outer annular shoulder 25b that abuts the shoulder 15 and which surrounds the second annular portion 30 of the cylindrical member 28. A third annular portion 31 extends from the second annular portion 30 and fits within the circular opening 26 of the retainer 25. A non-circular portion 32 extends from the third annular portion 31 and fits in the non-circular opening 23 of the disc 21.

Seal means are provided between the operating means 20 and the tubular member 6, such seal means including a first annular seal element 33 surrounding the first portion 29 and sealably engaging the portion 16 of the circular passage or opening 13.

Second seal means 34 are provided between the second annular portion 30 and the retainer 25 as shown; third seal means 35 are provided between the retainer 25 and the valve body as shown in FIG. 1 and fourth seal means 36 are provided between the third annular portion 31 and the circular opening 26 of the retainer 25 as shown in FIG. 1 of the drawings.

It will be noted that the first annular portion 29 of the cylindrical member 28 is of somewhat smaller diameter than the second annular portion 30, while the third annular portion 31 is of substantially smaller diameter than the first annular portion 29.

Seal means are thus provided between the spherical core means 12 and the tubular member 6 and between the operating means 20 and the tubular member 6.

Passage means 40 are provided in the spherical core means 12 for communicating fluid from the longitudinal fluid passage of the tubular member 6 to the exterior of the valve and within chamber 11. Since there is no seal means between the disc means 21 and the spherical core means 12, the fluid is communicated from chamber 11 to act on the seal means 36.

Figure 2:
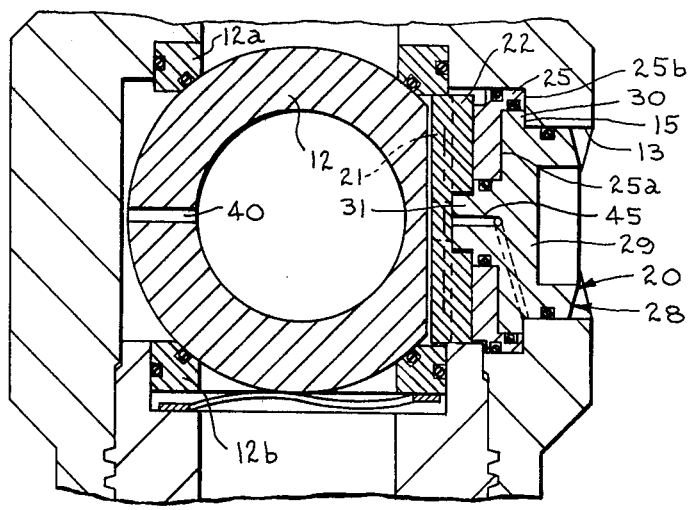
FIG. 2 is a sectional view of the valve arrangement shown in FIG. 1 but rotated 90° to illustrate the spherical core in closed position.
Figure 3:
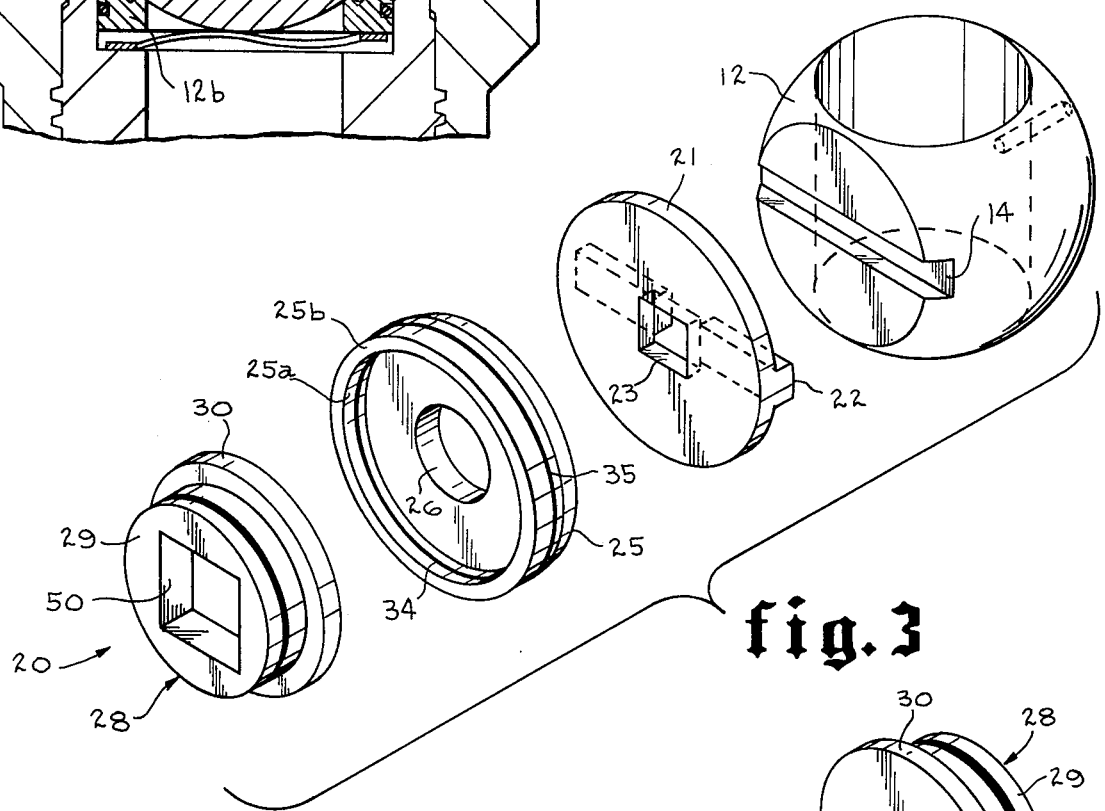
FIG. 3 is an exploded view illustrating the valve arrangement and the operating stem therefor.
Figure 4:
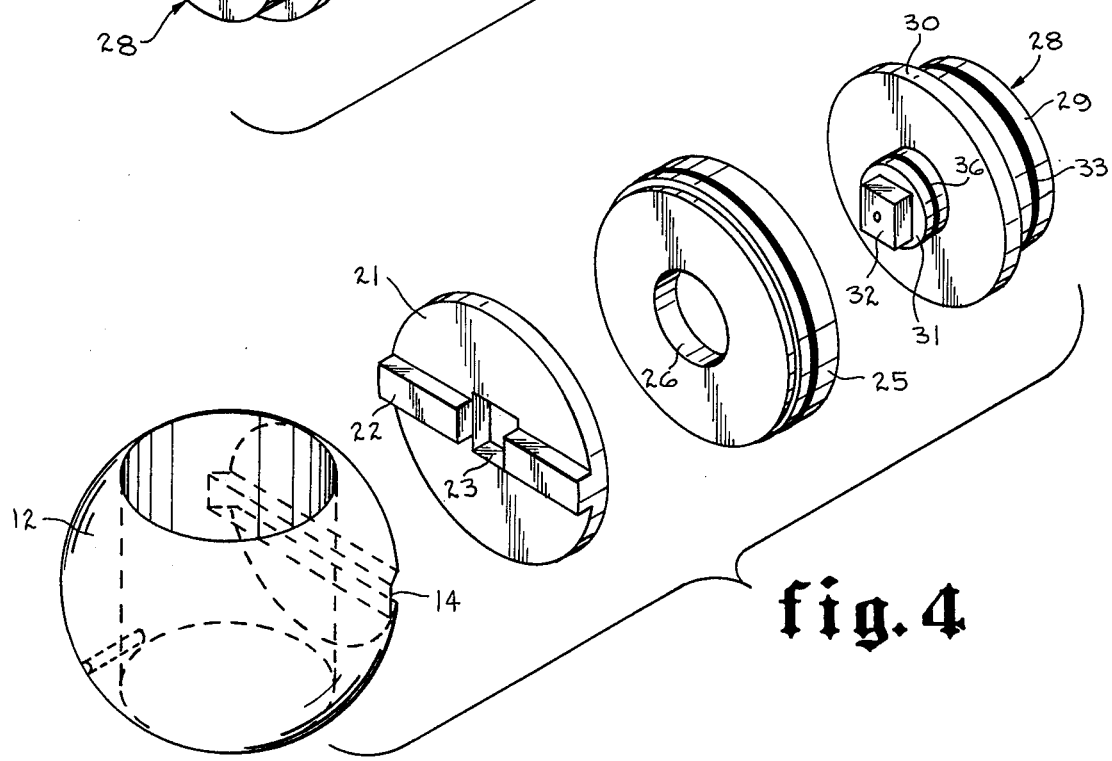
FIG. 4 is another exploded view similar to FIG. 3 but showing the other side of the components of the valve and operating stem.

Also, such fluid is communicated by the passage 45 extending through the third annular portion 31 from adjacent the disc means 21 to terminate between the first seal means 33 and second seal means 34 as illustrated in FIGS. 1 and 2 of the drawings.

The size of the annular portions 29, 30 and 31 with the seal means thereon are such that the communication of fluid pressure from the longitudinal fluid pressure 6a of the tubular member 6 through the passage means 45 acts on the seal means 33, 34 and 36 to substantially counterbalance the pressure acting on seal means 36 from within the longitudinal fluid passage 6a which tends to urge or push the operating means 20 outwardly of the lateral opening or passage 13.

Since the fluid pressure acting on the operating means 20 is substantially balanced with the fluid pressure in the longitudinal fluid passage 6a of the tubular member 6, there is less tendency or substantially no tendency for the operating means 20 to be jammed against the shoulder 15 formed in the lateral opening 13 thus making rotation of the operating means 20 easier.

The operating means is provided with a non-circular surface 50, shown in the form of the present invention as being a non-circular recess, which faces outwardly of the lateral opening 13 for engagement with any suitable tool whereby the operating means may be rotated. It can be appreciated that when the cylindrical member 28 is rotated, disc means 21 is also rotated since it is coupled to cylindrical member 28 by reason of the non-circular surface 32 on the cylindrical member 28 which fits within the non-circular opening 23 of the disc means 21.

In turn, the disc means interfits with the spherical core means 12 by reason of the projection 22 fitting within the recess 14 on the outer surface of the spherical core means 12.

It should be noted that the disc means is provided with a cam surface on its circumferential edge in a manner well known in the art which acts to stop the valve means 12 in an open position and in a closed position by engaging the end 7a of tubular member 7. Such arrangement is well known in the art and forms no part of the present invention and is thus not illustrated.

From the foregoing it can be seen that the fluid pressure within the fluid passage 6a of the tubular member or sub 6 is utilized to act on the seal means of the operating means in a manner so that the fluid pressure in the tubular member or sub tending to urge the operating means against the shoulder 15 and outwardly of the lateral passage 13 is counterbalanced. This substantially relieves the pressure tending to jam the second annular surface 30 against the shoulder 15 and enables the operating means 20 to be more freely and easily rotated to move the spherical core means to open and to closed position.

The foregoing disclosure and description of the invention are illustrative and explanatory thereof, and various changes in the size, shape, and materials as well as in the details of the illustrated construction may be made without departing from the spirit of the invention.

What is claimed is:

1. A valve arrangement for the fluid passage of a tubular member used in a well bore wherein the tubular member has a lateral, circular opening with an annular shoulder intermediate the ends of the opening, the valve arrangement including:
   a. spherical core means rotatably mounted in the tubular member;
   b. operating means connected to said spherical core means and rotatably supported in the tubular member to open and close said spherical core means for controlling flow through the fluid passage of the tubular member;
   c. seal means between said spherical core means and tubular member and between said operating means and tubular member;
   d. said spherical core means and operating means having fluid passage means for conducting fluid from the fluid passage of the tubular member to act on said seal means between said operating means and tubular member for substantially counterbalancing the fluid pressure in the tubular member acting on said operating means;
   e. said operating means fitting in the circular opening in the tubular member and including:
      1. disc means having a non-circular opening therein and a projection extending laterally thereof;
      2. retainer means having a circular opening therein;
      3. a cylindrical member having a first annular portion fitting on one side of the shoulder in the circular opening in the tubular member; a second annular portion of larger diameter than the first annular portion and abutting the shoulder in the circular opening in the tubular member; a third annular portion having a diameter smaller than the first annular portion and fitting in the circular opening of said retainer means; and a non-circular portion extending from said third annular portion and fitting in the non-circular opening of said disc means;

f. said spherical core means having a recess on the outer surface thereof with which said projection on said disc means is engaged; and g. said first annular portion of said cylindrical member having a non-circular surface facing outwardly of the lateral opening in the tubular member whereby said cylindrical member of said operating means may be engaged and rotated whereupon said spherical core means may be rotated to open and close the fluid passage in the tubular member.

2. The invention of claim 1 wherein said seal means between said operating means and tubular member includes:

a. first seal means between said first annular portion and tubular member;

b. second seal means between said second annular portion and said retainer;

c. third seal means between said retainer and said tubular member; and d. fourth seal means between said third annular portion and said retainer;

and wherein the fluid passage means in said operating means extends through said third annular portion from adjacent said disc means to a point intermediate said first and second seal means between said operating means and tubular member.

3. The invention of claim 2 wherein the cross sectional area of said cylindrical member at said second seal means minus the cross sectional area of the cylindrical member at said first seal means is approximately equal to the cross sectional area of said cylindrical member at said fourth seal means.

* * * * *